July 28, 1942. T. LINDNER Re. 22,148

MONEY RACK

Original Filed Nov. 2, 1938

INVENTOR.
Theodor Lindner
BY Howard P. King
ATTORNEY.

Reissued July 28, 1942

Re. 22,148

UNITED STATES PATENT OFFICE 22,148

MONEY RACK

Theodor Lindner, New York, N. Y.

Original No. 2,205,298, dated June 18, 1940, Serial No. 238,434, November 2, 1938. Application for reissue June 12, 1941, Serial No. 397,768

1 Claim. (Cl. 133—11)

Figure 1:
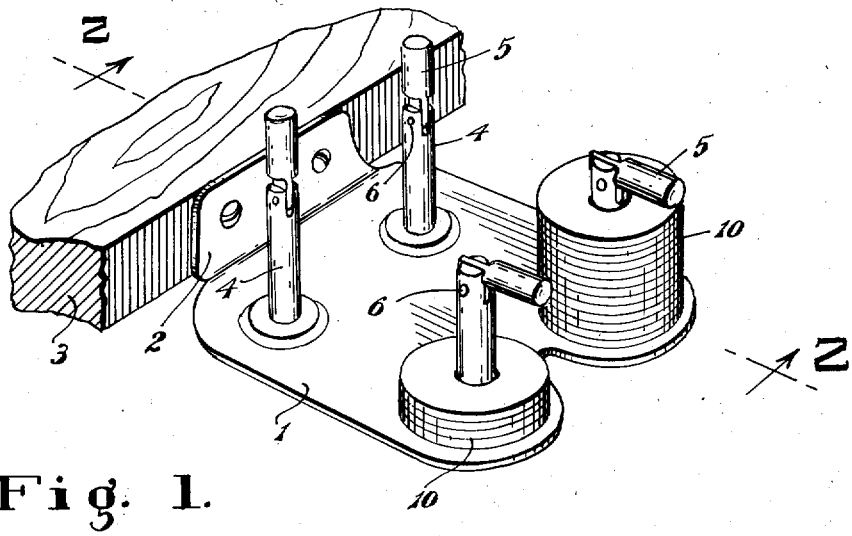

This invention pertains to improvements in money racks, so-called for use with games.

In various games tokens are used as measures of value or of scores obtained during play. Such tokens may be of different materials or of different colors, for ready differentiation. In the game of "mahjong," the "money" includes disks contining a central opening, and these disks during the progress of play are slipped over posts which are conveniently located for each player.

However, players desire to carry this money from place to place at intervals of play, or to arrange the disks without any particular care so as to be free to concentrate attention on the game itself. Moreover, players are freer to attend to the game when they feel that there may be no surreptitious removal of any counters from whatever position the players have arranged them.

An object of this invention is to provide means to secure the game counters against loss in whatever position a player may place them as a whole. The player may walk from place or even swing the counters on a carrier; or the carrier may fall to the ground, yet without loss of "money" to the player. Moreover, an object of this invention is to secure perforated disk counters on a carrier by means that permits quick removal of counters by the player, and quick securing of remaining or of additional counters. A further object is to provide in a money rack securing means for counters, particularly such means as are inexpensive, simple and rapid to produce.

These and other objects will be apparent on reference to the following specific description of this invention, taken with the accompanying drawing. Novel features of this invention are particularly pointed out in the appended claims.

Figure 2:
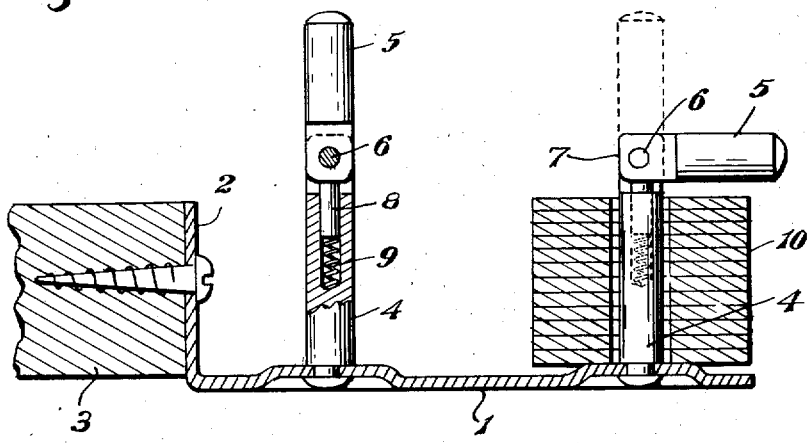

In the drawing,

Figure 1 represents a money rack in perspective, embodying one form of this invention; and Figure 2 represents a section through the rack along the line 2—2 of Figure 1.

According to this invention, the operation of arranging tokens of a game is greatly improved, and various stated objects of this invention are accomplished, by providing a counter post with a pivotal extension held by a spring in various selected positions.

Referring more particularly to the drawing for specific illustrative description, though this invention may be practiced otherwise than in the particular form shown, the structure comprises a base plate 1 adapted to be secured, as by flange 2, to a board 3, such as a game rack of the sort used in the "mahjong" game. Secured to base 1 are a plurality of vertical posts 4 which terminate in an extension member 5. Member 5 is pivotally mounted in the upper end of post 4 by means of cross pin 6. Preferably the upper end of post 4 is bifurcated as shown, with the engaging end of extension element 5 flattened to a plate which is supported between the bifurcations of post 4. Thus extension post 5 may be swung to different positions in a vertical plane.

Means are provided to secure extension 5 in its various positions. To this purpose, the lower and engaging end of extension 5 is provided with angular faces 7. To contact these faces and exert pressure against them a latch pin 8 is slidably housed in a central bore that is provided within the top portion of post 4. Mounted on post 4, as for example, beneath pin 8, is seated a spring 9, which as shown is adapted to press latch pin 8 upwardly. Also as shown, the upper face of pin 8 is flat and thus is adapted to seat against a contiguous face of pivoted member 5. It will now be apparent that this pressure from spring 9 tends to hold pivoted element 5 in whatever position may be determined by the contacting face.

In play annular counter disks 10 of selected material are placed upon the lower part of posts 4 according to whatever arrangement may be suitable to a player. The upper or extension element 5 is of course vertical, parallel to post 4. The stacks of "money" may be of various heights and values. After disks 10 are in place, they are secured by pressure from the player to force extension 5 to horizontal position, or to some intermediate position, about pivot pin 6. As shown, member 5 is horizontal. It will be apparent from the drawing that as extension 5 is thus rotated a corner at a face 7 first forces latch pin 8 down, and that as a new face 7 comes to position spring 9 then exerts pressure to hold the new face in position. As shown, also, and as at present preferred, there are provided three faces 7 to contact latch 8 during a quadrant of movement of extension element 5. With element 5 held in any selected position out of the vertical, the disks 10 having suitable central openings are kept from removal from post 4, which is to say that post 4 retains the counters whatever its position.

It may be added that other arrangements of contacting surfaces and edges between pivoted extension 5 and spring actuated latch 8 are contemplated within other embodiments of this invention; that is, this invention is not necessarily limited to the octagonal arrangement of faces 7 nor to the flat contacting surface of latch 8. Moreover, it is within the contemplation of this invention to provide other relative lengths and shapes of extension 5, as well as other shapes of part 4.

However, this invention provides means permitting players to concentrate their attention on the game itself without fear of losing counters as a money rack may be swung by a player in moving from one place to another, or as the rack may be left carelessly with counters on their posts. The posts are adapted to secure the counters in any event, and yet by a simple operation to release a disk for use.

While this invention has been described by illustration of preferred examples in accordance with the patent statutes, it will now be apparent to those skilled in this art that the principles of this invention may be embodied in other forms than those specifically set forth, within the scope of the appended claim.

I claim:

A plate to be secured to a game rack, a plurality of posts rising therefrom and at their ends each bearing an extension of relatively minor length compared with the post, each said post and extension being pivoted one with respect to the other and providing means for detaining the extension in position to which it is swung on said pivot, the extensions being of such minor length as to avoid extending into the radius of adjacent post extensions.

THEODOR LINDNER.